(12) United States Patent
Wang et al.

(10) Patent No.: US 8,711,560 B2
(45) Date of Patent: Apr. 29, 2014

(54) SNAP-ENGAGEMENT STRUCTURE

(75) Inventors: Po-Sheng Wang, New Taipei (TW);
Ching-Feng Hsieh, Taipei (TW)

(73) Assignees: Askey Technology (Jiangsu) Ltd. (CN);
Askey Computer Corp. (TW)

( * ) Notice: Subject to any disclaimer, the term of this patent is extended or adjusted under 35 U.S.C. 154(b) by 204 days.

(21) Appl. No.: 13/474,768

(22) Filed: May 18, 2012

(65) Prior Publication Data

US 2013/0258560 A1 Oct. 3, 2013

(30) Foreign Application Priority Data

Mar. 30, 2012 (TW) .............................. 101111349 A

(51) Int. Cl.
*G06F 1/16* (2006.01)
(52) U.S. Cl.
USPC .................... 361/679.58; 361/679.02; 429/97
(58) Field of Classification Search
USPC ................................................... 361/679.58
See application file for complete search history.

(56) References Cited

U.S. PATENT DOCUMENTS

| 5,716,730 A * | 2/1998 | Deguchi .......................... 429/97 |
| 6,302,454 B1 * | 10/2001 | Tsurumaru et al. ........... 292/175 |
| 8,241,777 B2 * | 8/2012 | Dong et al. .................... 429/100 |
| 2006/0166083 A1 * | 7/2006 | Zhang et al. .................... 429/97 |
| 2007/0258197 A1 * | 11/2007 | Graffius ........................ 361/681 |

* cited by examiner

*Primary Examiner* — Anthony Q Edwards
(74) *Attorney, Agent, or Firm* — Schmeiser, Olsen & Watts, LLP

(57) ABSTRACT

It is a snap-engagement structure whereby a mother body and a daughter body of a portable electronic device are snap-engaged with each other and thereby fixed to each other. The mother body includes two installation units. The snap-engagement structure includes a key unit, fastening units, and a first restoring unit. The key unit and the fastening units move relative to each other in different directions to effectuate enhanced snap-engagement, watertightness, and miniaturization.

10 Claims, 6 Drawing Sheets

SNAP-ENGAGEMENT STRUCTURE

CROSS-REFERENCE TO RELATED APPLICATION

This non-provisional application claims priority under 35 U.S.C. §119(a) on Patent Application No(s). 101111349 filed in Taiwan, R.O.C. on Mar. 30, 2012, the entire contents of which are hereby incorporated by reference.

FIELD OF TECHNOLOGY

The present invention relates to snap-engagement structures, and more particularly, to a snap-engagement structure adapted for use with a portable electronic product and characterized by an engagement mechanism for engagement with a casing of the portable electronic product.

BACKGROUND

A conventional battery-powered electronic product typically has a lid-equipped casing, and the lid is removable from the casing such that a battery therein can be changed easily. Alternatively, the lid and the battery are coupled together to facilitate battery replacement. However, gaps inevitably exist at the junction of the lid and the casing and admit moisture, thereby causing damage to electronic components inside the casing or causing a short circuit to the electronic components. Hence, watertightness is of vital importance to battery-powered electronic products.

According to the prior art, the lid is fixed to the casing by means of a snap-engagement structure. Referring to FIG. 1, a portable electronic product has a casing 1, a lid 2, and a snap-engagement structure 4. A receiving space 3 is provided on one side of the casing 1. The lid 2 is received in the receiving space 3. The snap-engagement structure 4 is disposed at the casing 1. The snap-engagement structure 4 further comprises a key 5 and an engaging element 6. In order for the lid 2 to be fixed to the receiving space 3, it is necessary that the engaging element 6 and the key 5 move in the same direction which is parallel to the lid 2. That is to say, it is necessary for the engaging element 6 to move in the same direction as the key 5 does, in order for the engaging element 6 to be fixed to or removed from an engaging slot 7 of the lid 2, such that the lid 2 is fixed to or removed from the casing 1.

The aforesaid prior art, which is characterized by same-direction movement, has a drawback described below. The snap-engagement structure 4 is made thick in order to provide sufficient snap-engagement for fastening the lid 2 tightly to the receiving space 3 of the casing 1 and thereby preventing moisture from invading into the receiving space 3 to cause a short circuit. However, the snap-engagement structure 4 that thick hinders miniaturization of a portable electronic device.

Accordingly, the present invention provides a snap-engagement structure for use with a portable electronic product to enhance snap-engagement, watertightness, and miniaturization.

SUMMARY

It is an objective of the present invention to provide a snap-engagement structure for use with a portable electronic product to enhance snap-engagement.

Another objective of the present invention is to provide a portable electronic product having the snap-engagement structure, such that the portable electronic product is capable of watertightness and suitable for miniaturization.

In order to achieve the above and other objectives, the present invention provides a snap-engagement structure for fixing a daughter body to a mother body, the mother body having two installation units, the snap-engagement structure comprising: a key unit having a first coupling portion and an advancing portion for driving the key unit to move in a first direction; at least a fastening unit having an engaging portion and a second coupling portion, the engaging portion being engaged with and fixed to a corresponding one of the installation units, the second coupling portion being movably abutted against the first coupling portion to enable the first coupling portion and the second coupling portion to move relative to each other, thereby causing the at least a fastening unit to move in a second direction and causing the engaging portion to be engaged with or disengaged from the corresponding one of the installation units; and a first restoring unit connected between the key unit and the daughter body, thereby allowing the key unit to undergo reciprocal motion in the first direction.

In order to achieve the above and other objectives, the present invention provides a portable electronic device comprising the snap-engagement structure. The portable electronic device comprises: a mother body having two installation units; and a daughter body removably coupled to one end of the mother body.

Compared with the prior art, the present invention provides a snap-engagement structure which comprises a key unit and fastening units. The key unit and the fastening units can be connected and moved in different directions interactively to achieve snap-engagement. The present invention further enables a snap-engagement structure of a portable electronic product to enhance snap-engagement, watertightness, and miniaturization.

BRIEF DESCRIPTION

Objectives, features, and advantages of the present invention are hereunder illustrated with specific embodiments in conjunction with the accompanying drawings, in which.

DETAILED DESCRIPTION

Figure 1:
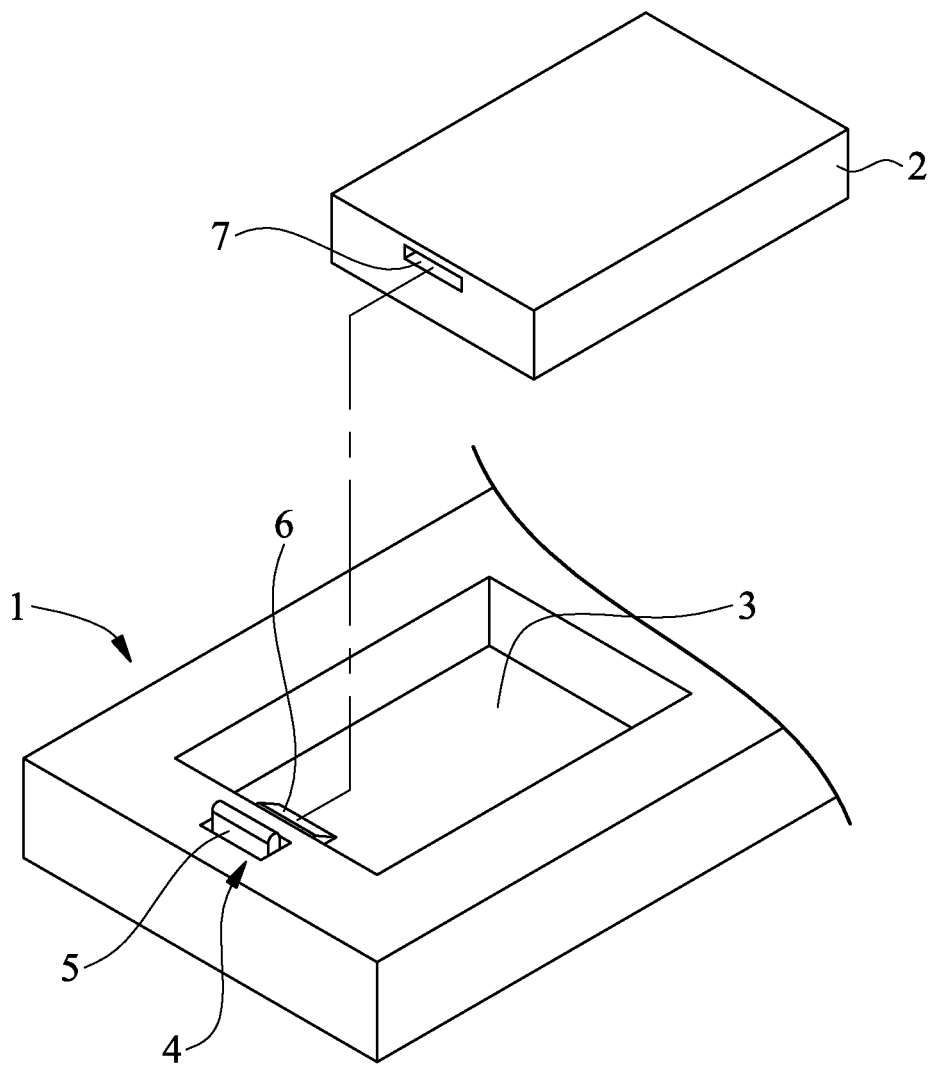
FIG. 1 (PRIOR ART) is a structural schematic view of a conventional electronic product.
Figure 2:
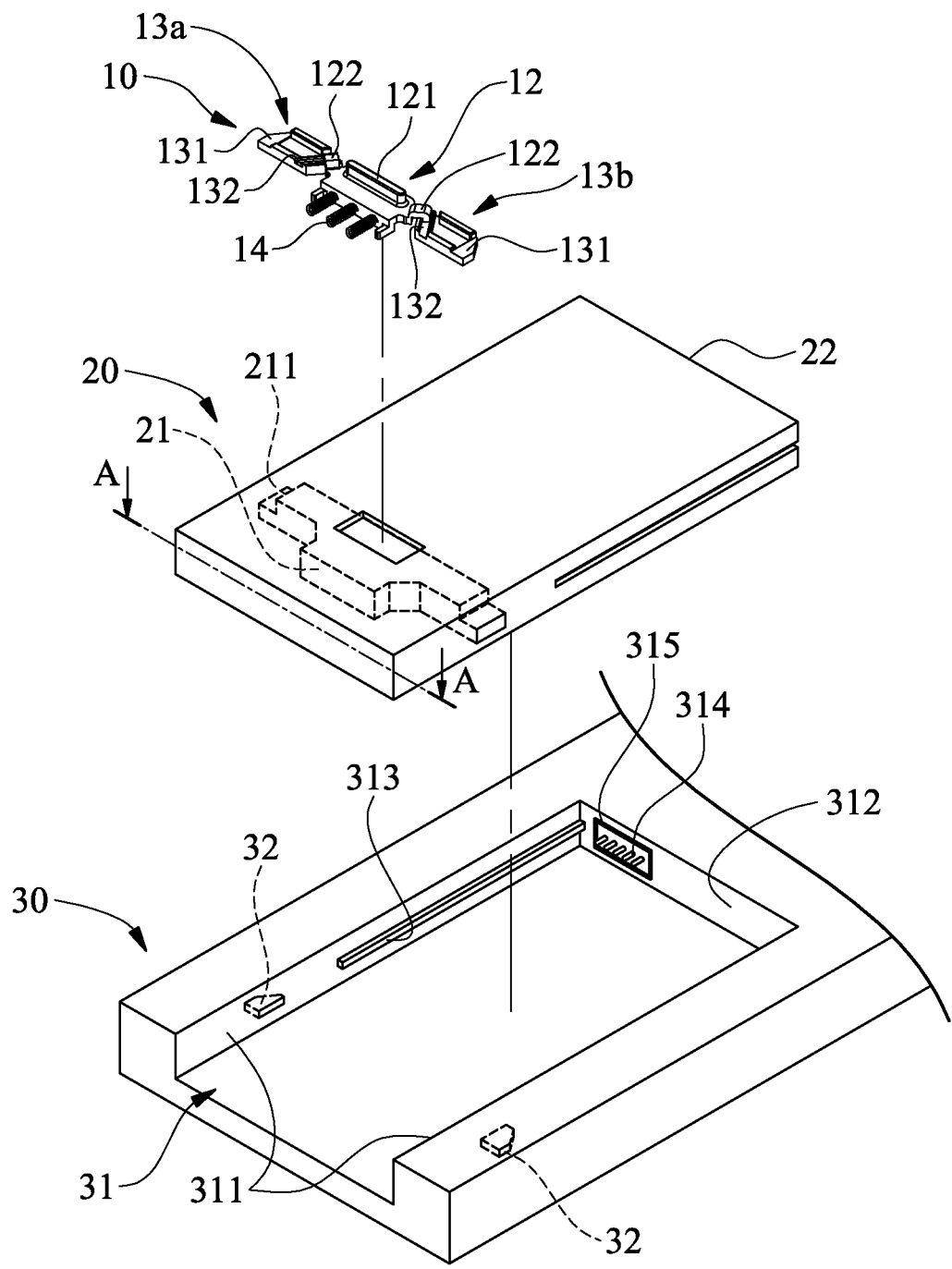
FIG. 2 is an exploded view of a portable electronic device according to the first specific embodiment of the present invention.

Referring to FIG. 2, there is shown an exploded view of a portable electronic device according to the first specific embodiment of the present invention. As shown in FIG. 2, the portable electronic device comprises a mother body 30, a daughter body 20, and a snap-engagement structure 10.

The mother body 30 has therein a receiving space 31, two installation units 32, two first sides 311, and a second side 312. The receiving space 31 is positioned closer to one end of the mother body 30 than the other end thereof, and is defined by the two first sides 311 and the second side 312. The installation units 32 are each exemplified by a slot and are disposed on the first sides 311, respectively. The first sides 311 each have a guide rail 313. The mother body 30 is the body proper of the portable electronic device. The mother body 30 accommodates at least an electronic component (not shown), such as a hard disk drive (HDD), a central processing unit (CPU), or a circuit board.

The daughter body 20 is received in the receiving space 31 and thus removably coupled to one end of the mother body 30. The daughter body 20 has therein a fixing chamber 21 for receiving the snap-engagement structure 10. The shape of the fixing chamber 21 resembles a short fat "T". The daughter body 20 further comprises a third side 22 corresponding in position to the second side 312. In this embodiment, the daughter body 20 is exemplified by a battery module including a cell (not shown). The battery module is installed in a battery compartment of the portable electronic device and fixed in place by snap-engagement provided by the snap-engagement structure in an embodiment of the present invention, but the present invention is not limited thereto. For instance, the snap-engagement structure of the present invention is applicable to a lid for covering and engaging with the portable electronic device.

The snap-engagement structure 10 is disposed in the fixing chamber 21 of the daughter body 20. With the snap-engagement structure 10, the daughter body 20 is engaged with and fixed to the mother body 30. The snap-engagement structure 10 comprises a key unit 12, fastening units 13a, 13b, and a first restoring unit 14.

The key unit 12 comprises an advancing portion 121 and two first coupling portions 122. The advancing portion 121 can be moved to drive the key unit 12 to move in a first direction. The fastening units 13a, 13b each have an engaging portion 131 and a second coupling portion 132. The engaging portions 131 are engaged with and fixed to the installation units 32, respectively. The second coupling portions 132 are movably abutted against the first coupling portions 122 to enable the first coupling portions 122 and the second coupling portions 132 to move relative to each other, respectively; as a result, the fastening units 13a, 13b move in a second direction and cause the engaging portions 131 to be engaged with or disengaged from the installation units 32, respectively. The first restoring unit 14 is connected between the key unit 12 of the snap-engagement structure 10 and an inner wall surface of the fixing chamber 21 of the daughter body 20. Hence, with the first restoring unit 14 being connected between the key unit 12 and the daughter body 20, the key unit 12 can undergo reciprocal motion in the first direction.

Figure 3:
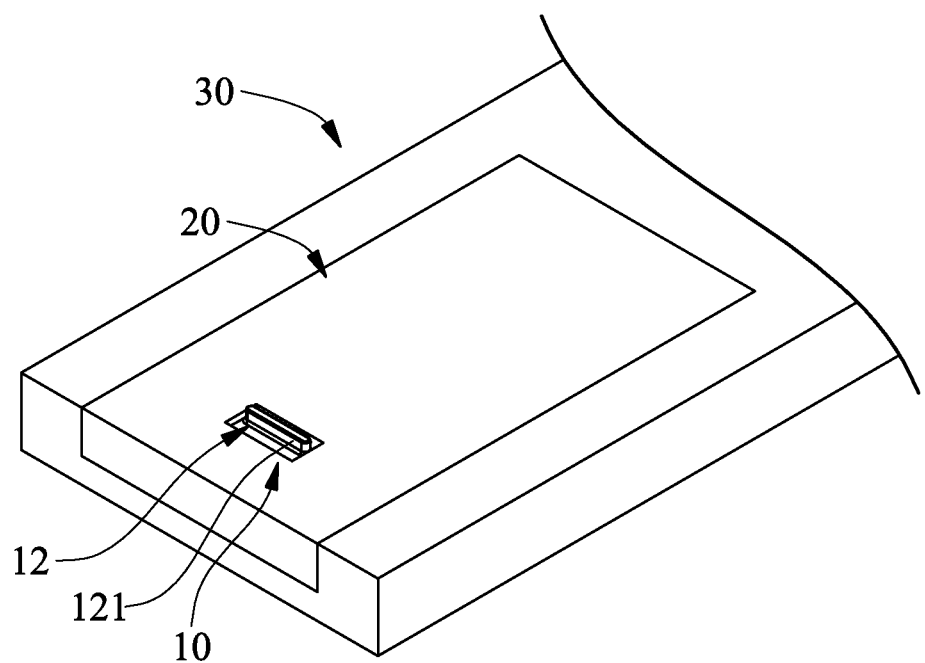
FIG. 3 is a schematic view of the portable electronic device according to the first specific embodiment of the present invention.

Referring to FIG. 3, there is shown a schematic view of the portable electronic device according to the first specific embodiment of the present invention.

Figure 4:
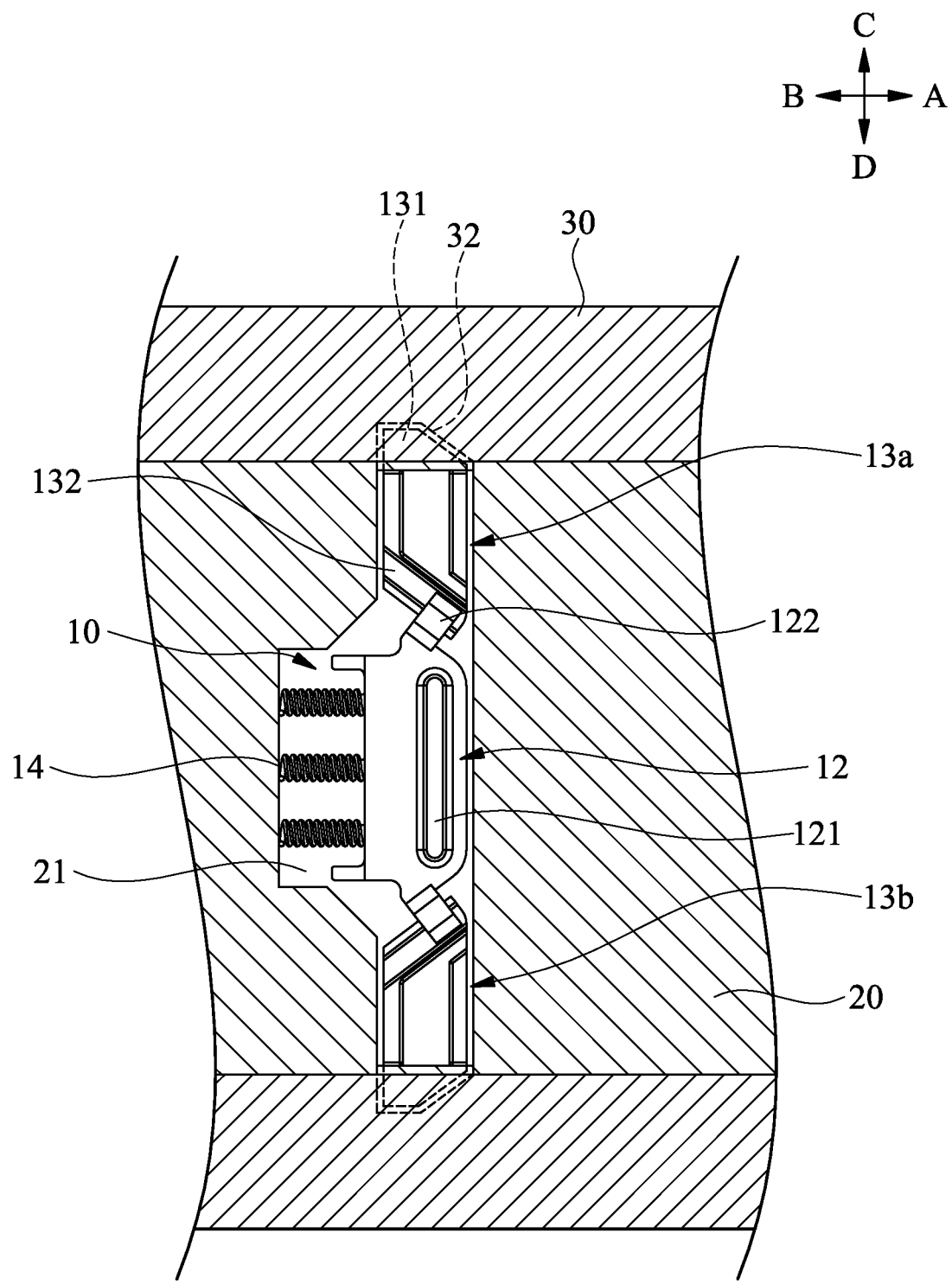
FIG. 4 is a schematic cross-sectional view of installation of the portable electronic device taken along line A-A of FIG. 2 according to the first specific embodiment of the present invention.
Figure 5:
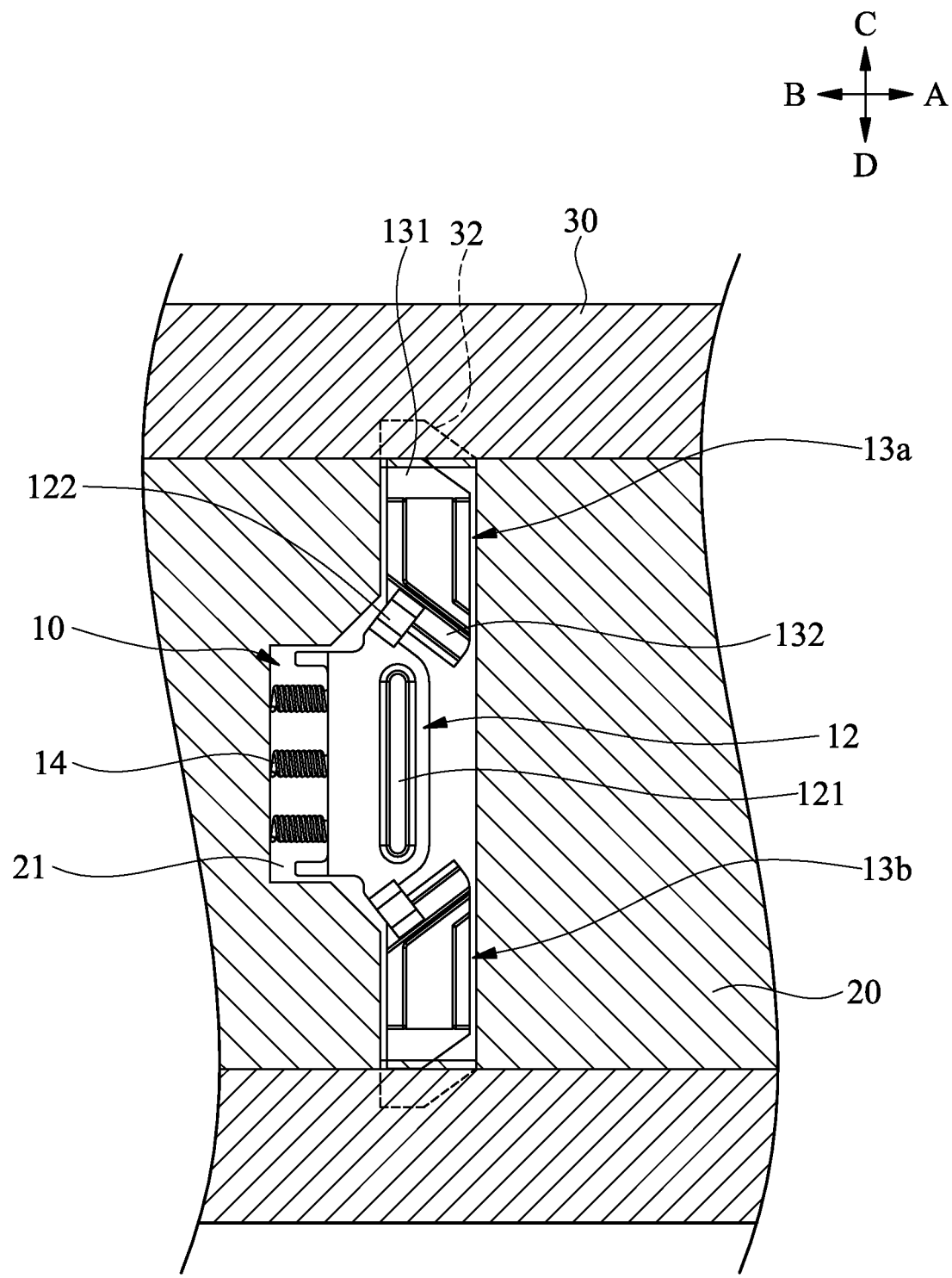
FIG. 5 is a schematic cross-sectional view of uninstallation of the portable electronic device taken along line A-A of FIG. 2 according to the first specific embodiment of the present invention.

Referring to FIG. 4 and FIG. 5, there are shown schematic cross-sectional views of installation and uninstallation of the portable electronic device taken along line A-A of FIG. 2 according to the first specific embodiment of the present invention, respectively. As shown in the diagrams, the first direction includes a restoring direction A and an advancing direction B (shown in the upper right corner of the diagrams), wherein the key unit 12 is subjected to the position-limiting effect of the fixing chamber 21 inside the daughter body 20 and thus moves in the first direction, that is, moving in the restoring direction A or the advancing direction B. The advancing portion 121 of the key unit 12 comprises a bump (not shown) serving as a fulcrum on which a user exerts an applied force (required for uninstallation of the portable electronic device and optional for installation of the portable electronic device) in the advancing direction B, such that the advancing portion 121 moves under the force applied. When the user does not apply any force to the advancing portion 121, the key unit 12 is pushed by the first restoring unit 14 and moved in the restoring direction A. The movement of the key unit 12 drives the fastening units 13a, 13b to move, thereby allowing the daughter body 20 to be mounted on or dismounted from the mother body 30. In this embodiment, after the snap-engagement structure 10 has been positioned inside the daughter body 20 of the mother body 30, only the advancing portion 121 of the key unit 12 is exposed and subjected to the force applied by the user, as shown in FIG. 3.

Referring to FIG. 4 and FIG. 5, in this embodiment, the snap-engagement structure 10 has two fastening units 13a, 13b. The fastening units 13a, 13b are subjected to the position-limiting effect of the fixing chamber 21 inside the daughter body 20 and thus move in the second direction. The second direction includes direction C and direction D, as shown in the upper right corner of the diagrams. The fastening unit 13a moves in direction C such that the engaging portion 131 thereof can be fastened to a corresponding one of the installation units 32. The fastening unit 13a moves in direction D such that the engaging portion 131 thereof can be released from the corresponding one of the installation units 32. The fastening unit 13b also operates in the same manner as the fastening unit 13a does, but in reverse directions and with the other one of the installation units 32.

In this embodiment, the first direction is perpendicular to the second direction.

In this embodiment, the two opposite ends of the first restoring unit 14 abut against the key unit 12 and an inner wall surface of the fixing chamber 21, respectively, such that the key unit 12 can undergo reciprocal motion in the first direction. That is to say, the key unit 12 moves in the restoring direction A or the advancing direction B while interacting with the first restoring unit 14. Specifically speaking, the first restoring unit 14 is a spring or a resilient element. The first restoring unit 14 is compressed as soon as the user exerts an applied force upon the key unit 12 and thereby moves the key unit 12 in the advancing direction B. Once the user releases the applied force, the first restoring unit 14 produces a resilient restoring force that pushes the key unit 12 back to its position shown in FIG. 4. In this embodiment, the first restoring unit 14 is exemplified by three aligned springs, and the quantity of the springs is subject to changes as needed.

This embodiment and the drawings are not restrictive of the positioning of the snap-engagement structure 10 at the daughter body 20, because the snap-engagement structure 10 can be positioned at the daughter body 20 in any manner as long as the snap-engagement structure 10 is capable of snap-engagement.

In this embodiment, the first coupling portions 122 each comprise a sliding element, and the second coupling portions 132 each comprise a groove. The grooves are oblique to the lengthwise dimension of the daughter body 20 and the mother body 30 shown in FIGS. 4, 5. The sliding elements correspond in position to the oblique grooves, respectively. The key unit 12, the fastening units 13a, 13b, and the first restoring unit 14 are coplanar.

Referring to FIG. 5, to remove the daughter body 20 from the mother body 30, the user pushes and moves the key unit 12 in the advancing direction B to thereby compress the first restoring unit 14. The second coupling portions 132 are movably abutted against the first coupling portions 122 to enable the first coupling portions 122 and the second coupling portions 132 to move relative to each other, respectively, such that the sliding elements slide along the oblique grooves in the advancing direction B, respectively, to drive the fastening units 13a, 13b to move in the second direction, thereby causing the engaging portions 131 of the fastening units 13a, 13b to disengage from the installation units 32 on the first sides 311 of the mother body 30, respectively, as shown in FIG. 5. Afterward, the user can withdraw the daughter body 20 smoothly from the receiving space 31 of the mother body 30 because the withdrawal process is accompanied by the sliding of the guide rails 313 on the first sides 311 of the mother body 30 along guide grooves formed at the daughter body 20, respectively. To this end, the guide grooves have to correspond in position to the guide rails 313, respectively.

Referring to FIG. 2, to mount the daughter body 20 on the mother body 30, the user can push the daughter body 20 smoothly into the receiving space 31 of the mother body 30 because the pushing process is accompanied by the sliding of the guide rails 313 along the guide grooves, respectively. In the course of pushing the daughter body 20 into the receiving space 31, not only do the fastening units 13a, 13b retract inward (see FIG. 5) to allow the daughter body 20 to be pushed into the receiving space 31, but the key unit 12 moves in the advancing direction B and thereby compresses the first restoring unit 14—these persist until the daughter body 20 is fully inserted into the receiving space 31. Hence, the first restoring unit 14 causes the key unit 12 to move in the restoring direction A to return to its position shown FIG. 4. Engagement of the first coupling portions 122 with the second coupling portions 132, respectively, causes the sliding elements to slide along the oblique grooves, respectively, such that the fastening units 13a, 13b move in the second direction until the engaging portions 131 of the fastening units 13a, 13b are snap-engaged with the installation units 32 of the mother body 30, respectively, as shown in FIG. 4. At this point in time, the daughter body 20 is fixed to the mother body 30.

The shape and position of the oblique groove and the sliding element as well as the inclination of the oblique groove are not limited by this embodiment and the drawings, but are subject to changes as needed or are designed according to distance of the journey taken by the fastening units to reach the installation units.

Figure 6:
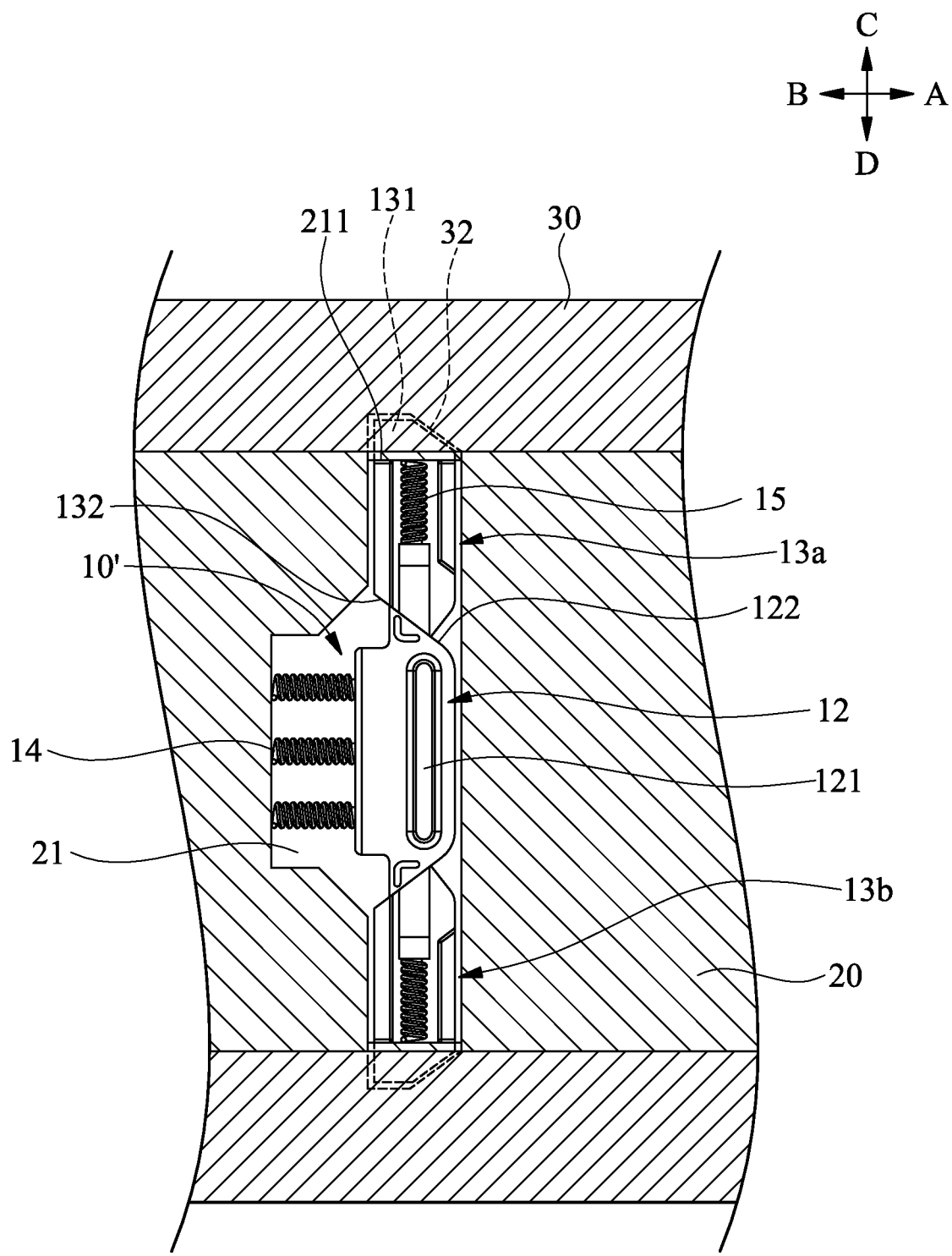
FIG. 6 is a schematic cross-sectional view of installation of a portable electronic device taken along line A-A of FIG. 2 according to the second specific embodiment of the present invention.

Referring to FIG. 6, there is shown a schematic cross-sectional view of installation of a portable electronic device taken along line A-A of FIG. 2 according to the second specific embodiment of the present invention. As shown in FIG. 6, a snap-engagement structure 10' comprises the key unit 12, the fastening units 13a, 13b, and the first restoring unit 14. The key unit 12 moves in the first direction. The fastening units 13a, 13b move in the second direction. In this embodiment, the first direction is perpendicular to the second direction. This embodiment is different from the preceding embodiment in that, in this embodiment, the first coupling portion 122 and the second coupling portion 132 have slanted surfaces, respectively, which correspond in position to each other, such that the first coupling portion 122 and the second coupling portion 132 can abut against each other and move relative to each other. The snap-engagement structure 10' further comprises at least a second restoring unit 15 connected between the second coupling portion 132 and the daughter body 20 and adapted to restrict the fastening units 13a, 13b to movement in the second direction.

In this embodiment, the at least a second restoring unit 15 is exemplified by a spring. The spring has one end connected to the second coupling portion 132, and has the other end connected to a position-limiting side 211 of the fixing chamber 21 of the daughter body 20. The user pushes and moves the key unit 12 in the advancing direction B and thereby compresses the first restoring unit 14. The at least a second restoring unit 15 enables the second coupling portions 132 of the fastening units 13a, 13b to abut against and slide relative to the first coupling portion 122 of the key unit 12, respectively, such that the fastening units 13a, 13b move in the second direction, thereby causing the engaging portions 131 of the fastening units 13a, 13b to disengage from the installation units 32 of the mother body 30, respectively. Then, the user removes the daughter body 20 from the receiving space 31 of the mother body 30 to finalize the uninstallation of the daughter body 20. Conversely, once the user releases an applied force previously exerted upon the key unit 12, the first restoring unit 14 will cause the key unit 12 to move in the restoring direction A, such that the first coupling portions 122 of the key unit 12 will abut against and slide relative to the second coupling portions 132 of the fastening units 13a, 13b, respectively. As a result, the second restoring unit 15 is compressed as shown in FIG. 6, such that the fastening units 13a, 13b move in the second direction, thereby allowing the engaging portions 131 of the fastening units 13a, 13b to snap-engage with the installation units 32 of the mother body 30, respectively. At this point in time, the daughter body 20 is fixed to the mother body 30.

Referring to FIG. 2, the mother body 30 comprises a plurality of terminals 314 disposed on the second side 312 received in the receiving space 31. The terminals 314 can be electrically connected to conductive elements (not shown) disposed on the third side 22 of the daughter body 20 having a cell, respectively. The second side 312 further comprises a waterproof element 315 disposed at the periphery of the second side 312. The waterproof element 315 is a waterproof pad, a waterproof rubber, a waterproof foam, or any waterproof element capable of producing a waterproof effect. In this embodiment, the waterproof element 315 is, for example, a ring-shaped waterproof pad disposed at the periphery of the terminals 314. Once the daughter body 20 is snap-engaged with the mother body 30 and held firmly with the snap-engagement between the engaging portions 131 of the fastening units 13a, 13b and the installation units 32, respectively, and with the first restoring unit 14, the third side 22 of the daughter body 20 will abut against the second side 312 of the mother body 30 to thereby compress the waterproof pad disposed between the second side 312 and the third side 22 and enhance the waterproof effect. Alternatively, the waterproof element 315 is disposed at the periphery of the third side 22.

The aforesaid embodiments are not restrictive of the shape of the key unit. The bump of the advancing portion 121 can be formed on the other side of the key unit 12 so as to be opposite to the first restoring unit 14, and is pressed to achieve snap-engagement. Also, the bump is subject to changes as needed.

Compared with the prior art, the present invention provides a snap-engagement structure whereby snap-engagement is achieved by moving the key unit and the fastening units connected thereto in different directions and relative to each other. The present invention further provides a portable electronic device comprising the snap-engagement structure for enhancing snap-engagement, watertightness, and miniaturization.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A snap-engagement structure for fixing a daughter body to a mother body, the mother body having two installation units, the snap-engagement structure comprising:
    a key unit having a first coupling portion and an advancing portion for driving the key unit to move in a first direction;
    at least a fastening unit having an engaging portion and a second coupling portion, the engaging portion being engaged with and fixed to a corresponding one of the installation units, the second coupling portion being movably abutted against the first coupling portion to enable the first coupling portion and the second coupling portion to move relative to each other, thereby causing the at least a fastening unit to move in a second direction and causing the engaging portion to be engaged with or disengaged from the corresponding one of the installation units; and
    a first restoring unit connected between the key unit and the daughter body, thereby allowing the key unit to undergo reciprocal motion in the first direction.

2. The snap-engagement structure of claim 1, wherein the first direction is perpendicular to the second direction.

3. The snap-engagement structure of claim 1, wherein the first coupling portions each comprise a sliding element, and the second coupling portions each comprise a groove, with the sliding elements corresponding in position to the grooves, respectively.

4. The snap-engagement structure of claim 1, further comprising at least a second restoring unit connected between the second coupling portion and the daughter body for restricting the fastening units to movement in the second direction.

5. The snap-engagement structure of claim 4, wherein the first coupling portion and the second coupling portion have two slanted surfaces corresponding to each other, respectively.

6. The snap-engagement structure of claim 1, wherein the first restoring unit is one of a spring and a resilient element.

7. A portable electronic device comprising the snap-engagement structure of claim 1, comprising:
    a mother body having two installation units; and
    a daughter body removably coupled to one end of the mother body.

8. The portable electronic device of claim 7, wherein the mother body has a receiving space for receiving the daughter body, and the installation units of the mother body are slots.

9. The portable electronic device of claim 8, wherein the daughter body comprises a cell and has a third side electrically connectable to a second side of the mother body.

10. The portable electronic device of claim 9, further comprising a waterproof element disposed at a periphery of one of the second side and the third side.

* * * * *